US012242216B2

(12) United States Patent
Ootaka

(10) Patent No.: US 12,242,216 B2
(45) Date of Patent: Mar. 4, 2025

(54) TRANSFER UNIT AND IMAGE FORMING DEVICE

(71) Applicant: Oki Electric Industry Co., Ltd., Tokyo (JP)

(72) Inventor: Tomomi Ootaka, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 18/348,215

(22) Filed: Jul. 6, 2023

(65) Prior Publication Data

US 2024/0103411 A1 Mar. 28, 2024

(30) Foreign Application Priority Data

Sep. 28, 2022 (JP) ................................ 2022-155226

(51) Int. Cl.
*G03G 15/16* (2006.01)

(52) U.S. Cl.
CPC ..... *G03G 15/1685* (2013.01); *G03G 15/1615* (2013.01); *G03G 2215/00679* (2013.01); *G03G 2215/1623* (2013.01)

(58) Field of Classification Search
CPC ....................... G03G 15/1615; G03G 15/1685
See application file for complete search history.

(56) References Cited

U.S. PATENT DOCUMENTS

2004/0109709 A1 6/2004 Ishibashi
2007/0244285 A1 10/2007 Minagoshi
2011/0299892 A1* 12/2011 Minegishi ............ G03G 15/065 399/269
2013/0164050 A1 6/2013 Ito
2014/0161485 A1* 6/2014 Ono .................. G03G 15/0818 399/284
2015/0286165 A1 10/2015 Suzuki

FOREIGN PATENT DOCUMENTS

JP 2005-043593 A 2/2005
JP 2005037596 A 2/2005
JP 2006220965 A 8/2006
JP 2010134412 A 6/2010
JP 2010217600 A 9/2010

(Continued)

OTHER PUBLICATIONS

Davenas, J. et al. Influence of the molecular modifications on the properties of EPDM elastomers under irradiation. Nuclear Instruments and Methods in Physics Research Section B: Beam Interactions with Materials and Atoms, vol. 208, 2003, pp. 461-465. ISSN 0168-583X. (Year: 2003).*

(Continued)

*Primary Examiner* — Carla J Therrien
(74) *Attorney, Agent, or Firm* — Rabin & Berdo, P.C.

(57) ABSTRACT

A transfer unit that transfers a developing agent image formed with a developing agent, includes a belt; and a rotational body that stretches the belt. The rotational body includes a shaft body, and a surface layer provided on an outer side of the shaft body in radial directions. Surface roughness of an outer peripheral surface of the surface layer is greater than a volume mean particle diameter of the developing agent.

13 Claims, 12 Drawing Sheets

(56) References Cited

FOREIGN PATENT DOCUMENTS

| | | | |
|---|---|---|---|
| JP | 2013080119 A | | 5/2013 |
| JP | 2016109789 A | * | 6/2016 |

OTHER PUBLICATIONS

Machine Translation of JP 2016-109789. Jun. 20, 2016. (Year: 2016).*

Anonymous: "Overview of materials for Acrylonitrile Butadiene Styrene (ABS), Extruded", Jan. 25, 2024, XP093123911, Retrieved from the Internet: URL:https://www.matweb.com/search/OataSheetaspx?MatGUID=3a8afcddac864d4b8f58d40570d2e5aa&ckck=1.

Nashwan Q. Mahmood et al: "Effects of nanocrystalline calcium oxide particles on mechanical, thermal, and electrical properties of EPDM rubber", Colloid & Polymer Science, Springer Verlag, Heidelberg, DE, vol. 299, No. 11, Sep. 11, 2021, pp. 1669-1682, XP037603350, ISSN: 0303-402X, D01:10.1007/S00396-021-04888-5.

* cited by examiner

COMPARATIVE EXAMPLE C1

COMPARATIVE EXAMPLE C2

EXAMPLE 1 OR 2

EXAMPLE 1 OR 2

| | COMPARATIVE EXAMPLE C1 | COMPARATIVE EXAMPLE C2 | EXAMPLE 1 | EXAMPLE 2 |
|---|---|---|---|---|
| DEFORMATION OF TRANSFER BELT | ○ | × | ○ | ○ |
| FRICTIONAL FORCE WHEN DEVELOPING AGENT EXISTS IN BETWEEN | × | ○ | ○ | ○ |

TRANSFER UNIT AND IMAGE FORMING DEVICE

BACKGROUND OF THE INVENTION

1. Field of the Invention

The present disclosure relates to a transfer unit and an image foaming device.

2. Description of the Related Art

There has been proposed an image forming device that includes a transfer belt for transferring a developing agent image formed on an image carrier and rollers for stretching the transfer belt and reduces damage on a back surface (i.e., an inner peripheral surface) of the transfer belt by setting surface roughness of outer peripheral surfaces of the rollers less than or equal to 2 μm (see Patent Reference 1, for example).

Patent Reference 1 is Japanese Patent Application Publication No. 2005-43593.

However, when the developing agent has adhered to the outer peripheral surface of a drive roller for stretching and driving the transfer belt, there is a problem in that slippage becomes likely to occur between the outer peripheral surface of the drive roller and the inner peripheral surface of the transfer belt and the slippage causes a printing defect.

SUMMARY OF THE INVENTION

An object of the present disclosure is to make the printing defect due to the slippage of the transfer belt with respect to the drive roller unlikely to occur.

A transfer unit according to the present disclosure is a unit that transfers a developing agent image formed with a developing agent, including a belt and a rotational body that stretches the belt. The rotational body includes a shaft body and a surface layer provided on an outer side of the shaft body in radial directions. Surface roughness of an outer peripheral surface of the surface layer is greater than a volume mean particle diameter of the developing agent.

With the transfer unit and the image forming device according to the present disclosure, the printing defect due to the slippage of the transfer belt with respect to the drive roller can be made unlikely to occur.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

A transfer unit and an image forming device according to an embodiment will be described below with respect to the drawings. The following embodiment is just an example and it is possible to appropriately combine embodiments and appropriately modify each embodiment.

(1) Image Forming Device 1

Figure 1:
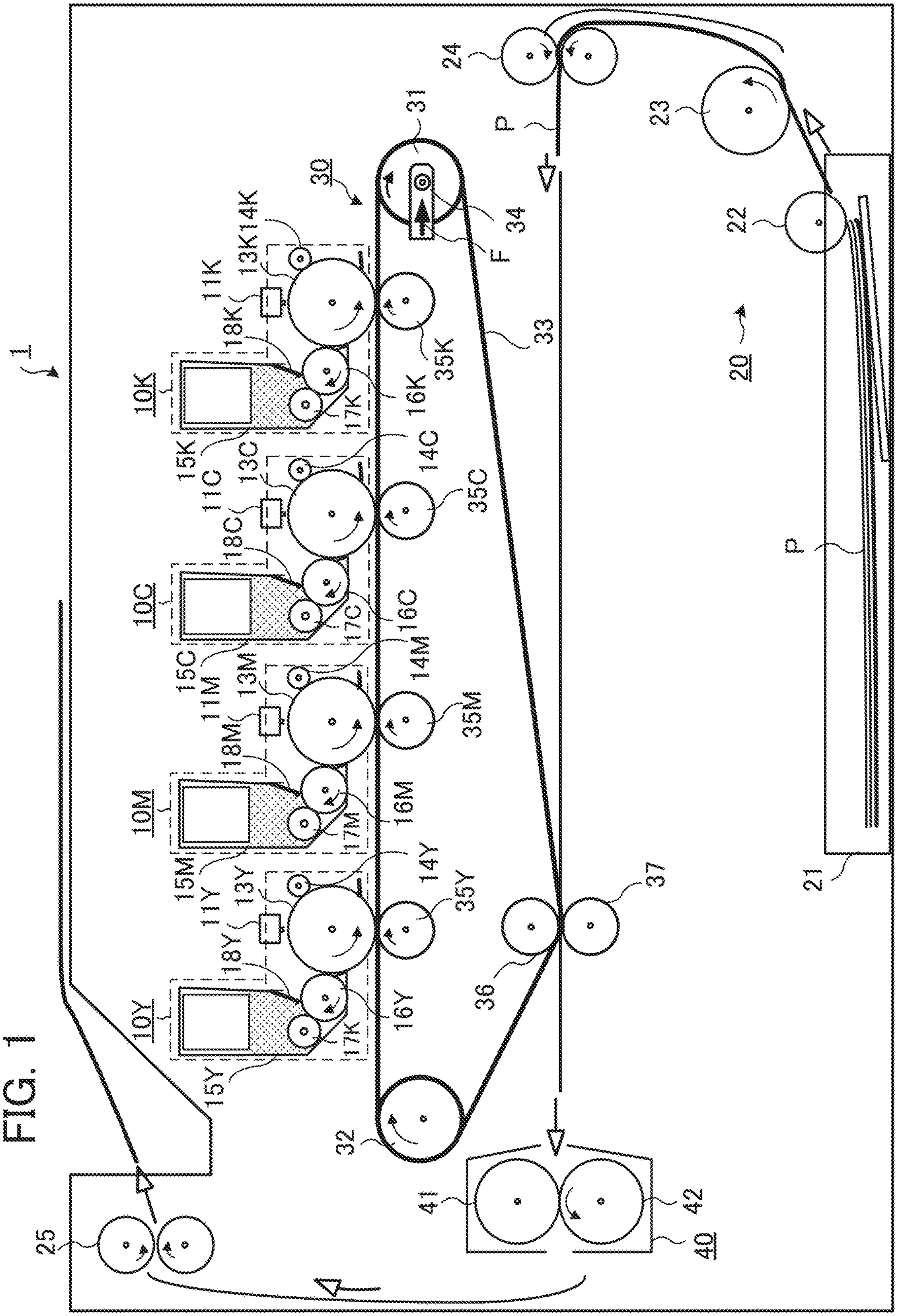
FIG. 1 is a schematic cross-sectional view showing a configuration of a transfer unit and an image foaming device according to an embodiment.

FIG. 1 is a schematic cross-sectional view showing a configuration of a transfer unit 30 and an image foaming device 1 according to an embodiment. The image forming device 1 is a color printer capable of printing a color image by an electrophotographic process using developing agents (i.e., toners) of four colors: black (B), cyan (C), magenta (M) and yellow (Y).

As shown in FIG. 1, the image foaming device 1 includes image foaming sections 10K, 10C, 10M and 10Y (represented also as "image forming sections 10") that respectively form developing agent images (i.e., toner images) made with developing agents on photosensitive drums 13K, 13C, 13M and 13Y (represented also as "photosensitive drums 13") as image carriers and the transfer unit (referred to also as a "primary transfer section") 30 that transfers (primary transfer) the developing agent images famed on the photosensitive drums 13K, 13C, 13M and 13Y onto a transfer belt (referred to also as an "intermediate transfer belt") 33. Further, the image forming device 1 includes a secondary transfer roller 37 that transfers (secondary transfer) the developing agent images held on the transfer belt 33 onto a record medium P such as a sheet at a secondary transfer position, a medium supply section (referred to also as a "medium conveyance section") 20 that supplies and conveys the record medium P, a fixing device 40, and an ejection roller 25 as a medium ejection section that ejects the record medium P after passing through the fixing device 40 to the outside. The image forming section is referred to also as an "image drum (ID) unit" or a "drum unit". The number of image forming sections included in the image foaming device 1 can also be three or less, or five or more. Furthermore, the image forming device 1 can also be a monochrome printer employing the electrophotographic process.

As shown in FIG. 1, the medium supply section 20 includes a medium cassette 21, a hopping roller 22 that sends out the record media P stacked in the medium cassette 21 sheet by sheet, a registration roller 23 that conveys the record medium P sent out from the medium cassette 21, and a roller pair 24 that conveys the record medium P.

The image forming sections 10K, 10C, 10M and 10Y are arranged in a line in a traveling direction (i.e., a moving direction) in a part over the transfer belt 33. The image foaming sections 10K, 10C, 10M and 10Y are formed to be freely attachable/detachable to/from a main body structure of the image forming device 1. The image foaming sections 10K, 10C, 10M and 10Y have the same structure as each other except for the difference in the color of the toner. However, the image forming sections 10K, 10C, 10M and 10Y may include image forming sections differing in the structure.

Optical print heads 11K, 11C, 11M and 11Y (represented also as "optical print heads 11") as exposure sections for those colors are respectively provided in upper parts of the image forming sections 10K, 10C, 10M and 10Y. Each of the optical print heads 11K, 11C, 11M and 11Y includes a light emitting element array as a plurality of light emitting elements arrayed in an axial direction of the photosensitive drum 13K, 13C, 13M, 13Y. The light emitting element is an LED (Light Emitting Diode) or a light emitting thyristor, for example. The exposure by each optical print head 11K, 11C, 11M, 11Y is performed on a uniformly charged surface of the photosensitive drum 13K, 13C, 13M, 13Y based on image data for the printing. The exposure section may also be famed with a laser optical system.

Each image foaming section 10K, 10C, 10M, 10Y includes the photosensitive drum 13K, 13C, 13M, 13Y supported to be rotatable, a charging roller 14K, 14C, 14M, 14Y (represented also as a "charging roller 14") as a charging member that uniformly charges the surface of the photosensitive drum 13K, 13C, 13M, 13Y, and a development device 15K, 15C, 15M, 15Y (represented also as a "development device 15") that foams a developing agent image corresponding to an electrostatic latent image by supplying the toner to the surface of the photosensitive drum 13K, 13C, 13M, 13Y after the electrostatic latent image is formed on the surface of the photosensitive drum 13K, 13C, 13M, 13Y by the exposure by the optical print head 11K, 11C, 11M, 11Y. The photosensitive drum 13K, 13C, 13M, 13Y is formed with an electrically conductive support member processed into a cylindrical shape and a photosensitive layer applied on the surface of the electrically conductive support member, for example. The photosensitive layer has structure in which a blocking layer, a change generation layer and a change transport layer are successively stacked from the surface of the electrically conductive support member.

The development device 15K, 15C, 15M, 15Y includes a developing agent storage part as a container storing the developing agent, a development roller 16K, 16C, 16M, 16Y (represented also as a "development roller 16") as a developing agent carrier that supplied the developing agent to the surface of the photosensitive drum 13K, 13C, 13M, 13Y, a supply roller 17K, 17C, 17M, 17Y (represented also as a "supply roller 17") as a developing agent supply body that supplies the developing agent stored in the developing agent storage part to the development roller 16K, 16C, 16M, 16Y, and a layer formation blade 18K, 18C, 18M, 18Y (represented also as a "layer formation blade 18") as a developing agent regulation member that regulates the thickness of a developing agent layer on the surface of the development roller 16K, 16C, 16M, 16Y. The development roller 16K, 16C, 16M, 16Y is formed with a shaft made of metal and an elastic body provided on the outer periphery of the shaft, for example. As this elastic body, semiconductive urethane rubber at rubber hardness of 70° (ASKER C) can be used, for example. The supply roller 17K, 17C, 17M, 17Y is formed with a shaft made of metal and a foam body provided on the outer periphery of the shaft. As this foam body, a silicone foam body at hardness of 50° (ASKER F) can be used.

The developing agents of black, yellow, magenta and cyan are made by using polyester resin, a coloring agent, a charge control agent and a releasing agent as major raw materials, and an external additive (hydrophobic silica) has been added. The developing agent is powder obtained by pulverization, for example. However, the developing agent may also be powder manufactured by a different method such as polymerization. A volume mean particle diameter (i.e., a volume average particle diameter) of the developing agent is 7 μm (or approximately 7 μm).

As shown in FIG. 1, the transfer unit 30 includes the transfer belt 33 in an endless shape for transferring the developing agent images onto the record medium P, a drive roller 31 and a driven roller 32 as rotational bodies that stretch the transfer belt 33, a backup roller 36 for the secondary transfer, and transfer rollers 35K, 35C, 35M and 35Y. The drive roller 31 is rotated by driving force from a drive mechanism such as a motor and makes the transfer belt 33 travel. The driven roller 32 rotates passively following the traveling of the transfer belt 33. The drive roller 31 includes a shaft body (shown in FIG. 3 which will be explained later) and a surface layer (shown in FIG. 3 which will be explained later) famed on the surface of the shaft body. The surface layer is referred to also as a coating layer.

The transfer rollers 35K, 35C, 35M and 35Y are arranged to face the photosensitive drums 13K, 13C, 13M and 13Y across the transfer belt 33. The developing agent images formed on the surfaces of the photosensitive drums 13K, 13C, 13M and 13Y are successively transferred onto the transfer belt 33 by the transfer rollers 35K, 35C, 35M and 35Y, by which a color image as a stack of a plurality of developing agent images is formed. After the transfer, the developing agent remaining on each photosensitive drum 13K, 13C, 13M, 13Y is removed by a cleaning member.

As resin material forming the transfer belt 33, polyimide (PI), polyvinylidene fluoride (PVDF), polyamideimide (PAT) and the like can be taken as examples. The transfer belt 33 has been manufactured by means of rotational molding, inflation or the like. Internal surface roughness of the transfer belt 33 is less than or equal to 0.05 μm, for example. The transfer belt 33 is stretched between the drive roller 31 and the driven roller 32. For the transfer belt 33, a spring mechanism 34 that applies force in an arrow F direction (direction for pressing the drive roller 31 towards the transfer belt 33) is provided on end parts (e.g., shaft bearing parts) rotatably supporting the drive roller 31. Thanks to the spring mechanism 34, the transfer belt 33 can maintain a condition of being stretched by a constant load.

Further, the transfer belt 33 is provided so as to pass through a secondary transfer section provided under the transfer unit 30. The secondary transfer section is formed by the secondary transfer roller 37 and the backup roller 36, and is arranged so that the backup roller 36 stretches the transfer belt 33. The secondary transfer roller 37 forms a transfer electric field for transferring the developing agent images on the transfer belt 33 onto the record medium P. Further, a preliminary adhesion roller for preliminary adhesion of the medium may be provided before the secondary transfer roller 37. The driven roller 32 and the backup roller 36 rotate accompanying the transfer belt 33 traveling due to the driving by the drive roller 31.

Arranged on a downstream side of the secondary transfer roller 37 is the fixing device 40 for fixing the developing agent images on the record medium P by means of heating and pressing. The fixing device 40 includes a pair of rollers 41 and 42 pressed against each other. The roller 41 is a heat roller including a built-in heater, and the roller 42 is a pressure roller pressed towards the roller 41. The record medium P having unfixed developing agent images thereon passes between the pair of rollers 41 and 42 of the fixing device 40. At that time, the unfixed developing agent images are heated, pressed and fixed on the record medium P.

On the downstream side of the fixing device 40, an ejection path and the ejection roller 25 for ejecting the record medium P to the outside are provided, and the ejected record medium P is then ejected to a stacker on a housing of the image forming device 1.

(2) Image Forming Device 1*a*

Figure 2:
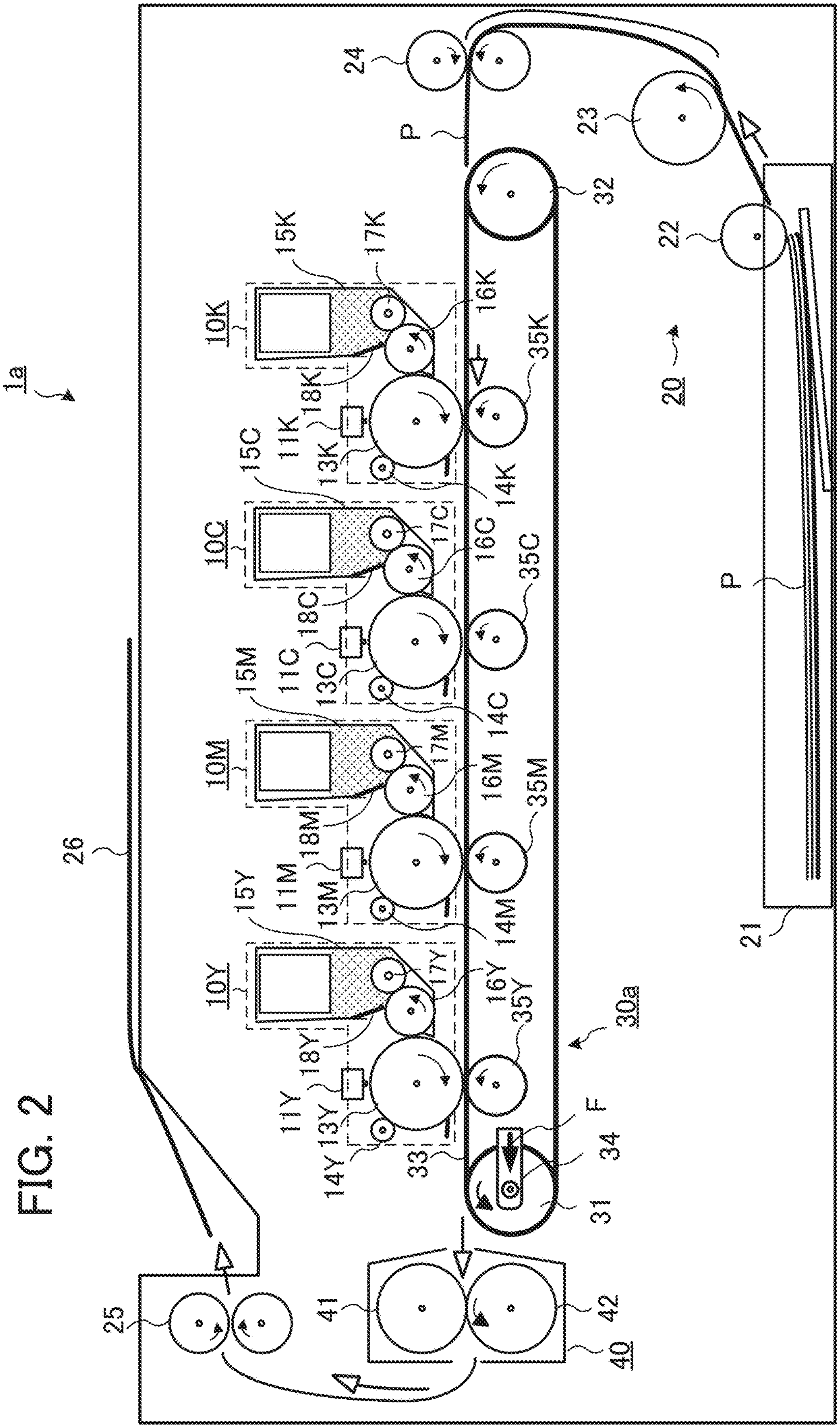
FIG. 2 is a schematic cross-sectional view showing a configuration of a transfer unit and an image foaming device according to a modification of the embodiment.

FIG. 2 is a schematic cross-sectional view showing the configuration of a transfer unit 30*a* and an image forming device 1*a* according to a modification of the embodiment. In FIG. 2, each component identical or corresponding to a component shown in FIG. 1 is assigned the same reference character as in FIG. 1. The image forming device 1*a* in FIG. 2 differs from the image foaming device 1 in FIG. 1 including the transfer unit 30 that secondarily transfers the developing agent images primarily transferred onto the transfer belt (conveyance belt) 33 as a belt onto the record medium P, in that the transfer unit 30*a* conveys the record medium P and transfers the developing agent images onto the record medium P (in that the image forming device 1*a* does not include the secondary transfer section). Except for this feature, the image forming device 1*a* shown in FIG. 2 is the same as the image foaming device in FIG. 1.

(3) Drive Roller 31

Figure 3A:
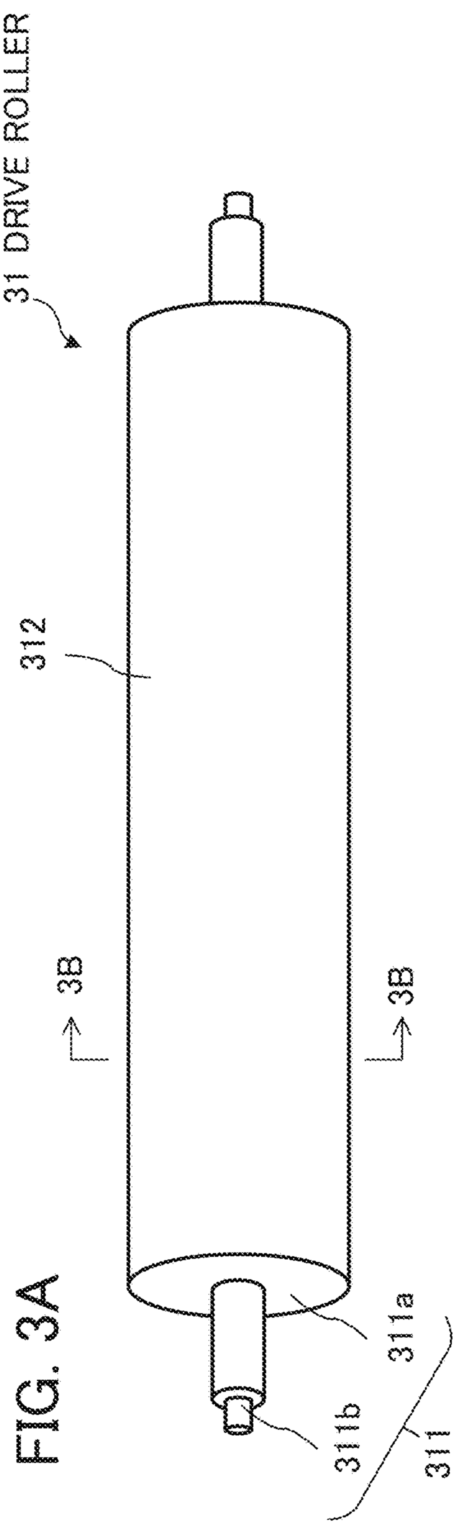
FIGS. 3A, 3B and 3C are a schematic perspective view, a schematic cross-sectional view and a principal part enlarged sectional view showing a drive roller of the transfer unit according to the embodiment.
Figure 3C:
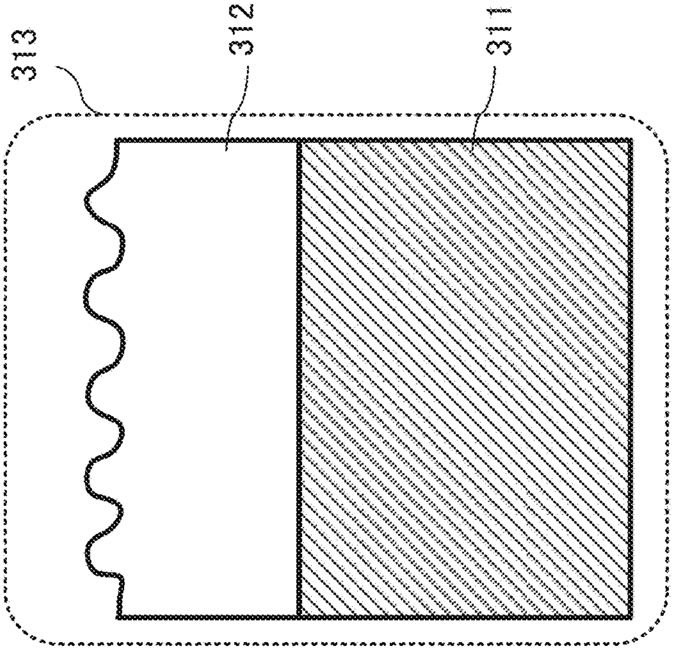
Figure 3B:
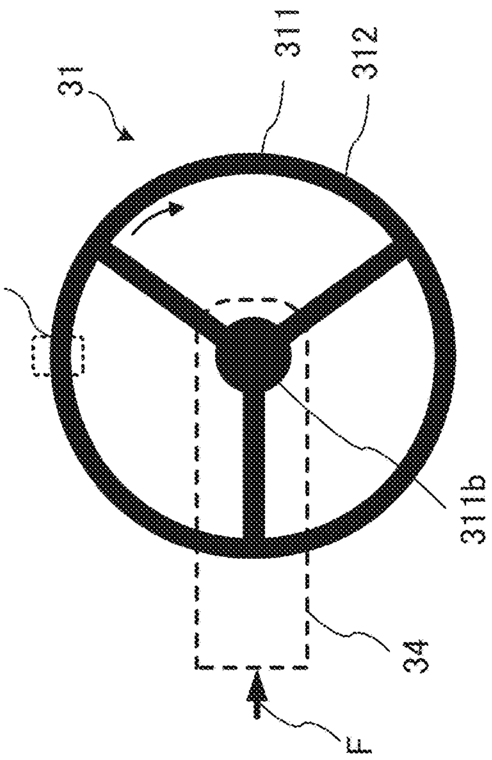

FIGS. 3A, 3B and 3C are a schematic perspective view, a schematic cross-sectional view and a principal part enlarged sectional view showing the drive roller 31 of the transfer unit 30 (or 30*a*) according to the embodiment. FIG. 3C is a diagram enlarging a part 313 in FIG. 3B. As shown in FIGS. 3A, 3B and 3C, the drive roller 31 includes a shaft body 311 and a surface layer 312 provided on an outer side of the shaft body 311 in radial directions (e.g., formed on the surface of the shaft body 311). In this embodiment, the surface layer 312 is formed so that surface roughness Rz of an outer peripheral surface of the surface layer 312 is greater than the volume mean particle diameter of the developing agents used in the image foaming device 1 (or 1*a*).

The shaft body 311 is famed by a three-arrow extrusion pipe 311*a* and a shaft 311*b*, for example. The surface layer 312 formed on an outer peripheral surface of the shaft body 311 is a coating layer famed by coating with resin material (coating material). The surface layer 312 is provided on the outer peripheral surface of the shaft body 311 in order to increase frictional force between the internal surface of the transfer belt 33 and the outer peripheral surface of the drive roller 31. The three-arrow extrusion pipe 311*a* is formed with aluminum material. The shaft 311*b* is famed with free-cutting steel material. The surface of the shaft 311*b* has undergone electroless nickel treatment. The resin material (coating material) forming the surface layer 312 is made up of a resin solution, a coloring pigment, an extender pigment, an additive (curing catalyst) and a diluent. The thickness of the surface layer 312 is approximately 100 μm. In this embodiment, urethane-based resin material is used as the resin material forming the surface layer 312. The resin material forming the surface layer 312 includes urethane resin as a principal component, for example. The principal component means a component occupying 50 wt. % or more of the entire surface layer 312. As measurement methods for identifying the urethane resin in the surface layer 312, there have been known gas chromatography mass spectrometry and Fourier transform infrared spectroscopic analysis (FTIR), for example. Toluene diisocyanate (TDI)-based curing agent, hexamethylene diisocyanate (HDI)-based curing agent and the like can be taken as examples of the curing catalyst in the urethane-based resin material (coating material). It is also possible to use acrylic resin, silicone resin, epoxy resin or the like as the resin material foaming the surface layer 312.

In the manufacture of the shaft body 311 of the drive roller 31, end parts of the three-arrow extrusion pipe 311*a* are processed so that the shaft 311*b* can be pressed in, and the surface of the shaft body 311 is cut so that the shaft body 311 fits in drawing dimensions. Thereafter, the three-arrow extrusion pipe 311*a* is pressed into the end parts of the three-arrow extrusion pipe 311*a*. The surface of the three-arrow extrusion pipe 311*a* is uniformly coated with the resin material forming the surface layer 312 at a constant speed by using a spray or the like. Thereafter, firing is done in an electric furnace and the drive roller 31 is completed. In this embodiment, comparative examples (comparative example C1 and comparative example C2) and examples (example 1 and example 2) were used. The surface roughness of the surface layer 312 in the comparative example C1 is the smallest (Rz=approximately 6 μm), and the surface roughness of the surface layer 312 in the comparative example C2 is the largest (Rz=55.4 μm). The example 1 and the example 2 differ from each other in the content of the curing catalyst; curing catalyst 0% in the example 1 and curing catalyst 2% in the example 2. The surface roughness Rz of the surface layer 312 in the example 1 is 22.2 μm, and the surface roughness Rz of the surface layer 312 in the example 2 is 15.6 μm. The surface roughness Rz was calculated from a region of approximately 1 mm×approximately 1 mm on the surface of the drive roller 31 by using a laser microscope.

A function required of the drive roller 31 is to drive the transfer belt 33. As rollers in contact with the transfer belt 33 in the transfer unit 30, there are the transfer rollers 35, the driven roller 32 and the backup roller 36 besides the drive roller 31. Since the transfer belt 33 is rotated by a roller exerting the highest frictional force on the transfer belt 33 among the contacting rollers, the drive roller 31 is configured so that its frictional force becomes the highest among the rollers in contact with the transfer belt 33. In this embodiment, driving force necessary for the drive roller 31 to drive the transfer belt 33 is higher than or equal to 6.66 N, and thus the frictional force between the outer peripheral surface of the drive roller 31 and the internal surface of the transfer belt 33 needs to be higher than or equal to 6.66 N. Further, stable driving force is necessary even when the image forming device 1 is stored or at rest (when the developing agent exists between the outer peripheral surface of the drive roller 31 and the internal surface of the transfer belt 33 due to the use of the image forming device 1).

Therefore, in this embodiment, frictional property and the surface roughness Rz of the material of the surface layer 312 of the drive roller 31 are prescribed. Further, to prevent the drive roller 31 from sticking to the transfer belt 33, the surface roughness Rz of the outer peripheral surface of the drive roller 31 is limited. Furthermore, to inhibit the transfer belt 33 from being deformed by undulation of the outer peripheral surface of the drive roller 31, the surface roughness Rz of the outer peripheral surface of the drive roller 31 is limited. Moreover, thermal property of the resin material is prescribed in order to prevent a change of state of the resin material (coating material) of the surface layer 312 in a use-transport temperature range (e.g., 10° C. to 70° C.).

For the measurement of the volume mean particle diameter, a volume median diameter of the developing agent was measured by using a precision particle size distribution measurement device Multisizer 3 (manufactured by Backman Coulter Inc.). Measurement conditions were as follows:

APERTURE DIAMETER: 100 μm

ELECTROLYTIC SOLUTION: Isoton II (manufactured by Backman Coulter Inc.)

DISPERSION SOLUTION: Neogen S-20F (manufactured by DKS Co., Ltd.) was dissolved in the aforementioned electrolytic solution and the concentration was adjusted to 5%.

For this measurement, 10 mg to 20 mg of a measurement sample was added to 5 mL of the aforementioned dispersion solution and dispersed for 1 minute by using an ultrasonic disperser, thereafter 25 mL of the electrolytic solution was added to the solution and dispersed for 5 minutes by using the ultrasonic disperser, and coagulation was removed by using mesh with 75 μm apertures, by which a sample dispersion solution was prepared.

Further, for the measurement, this sample dispersion solution was added to 100 mL of the aforementioned electrolytic solution, and distribution (i.e., volume particle size distribution) was obtained by measuring 30000 particles by using the aforementioned precision particle size distribution measurement device. Subsequently, in the measurement, based on the volume particle size distribution, the volume median diameter was obtained as the volume mean particle diameter (MV). The volume mean particle diameter) means a certain particle diameter when the mass of particles larger than the certain particle diameter occupies 50% of the mass of particles of the whole powdery matter in the particle diameter distribution of the powdery matter. The aforementioned precision particle size distribution measurement device measures the particle size distribution based on the Coulter principle. This Coulter principle, which is referred to as an aperture electric resistance method, is a method of measuring the volume of a particle by feeding a constant electric current through an aperture (thin cavity) in an electrolyte solution and measuring the change in the electric resistance of the aperture when the particle passes through the aperture.

Figure 4A:
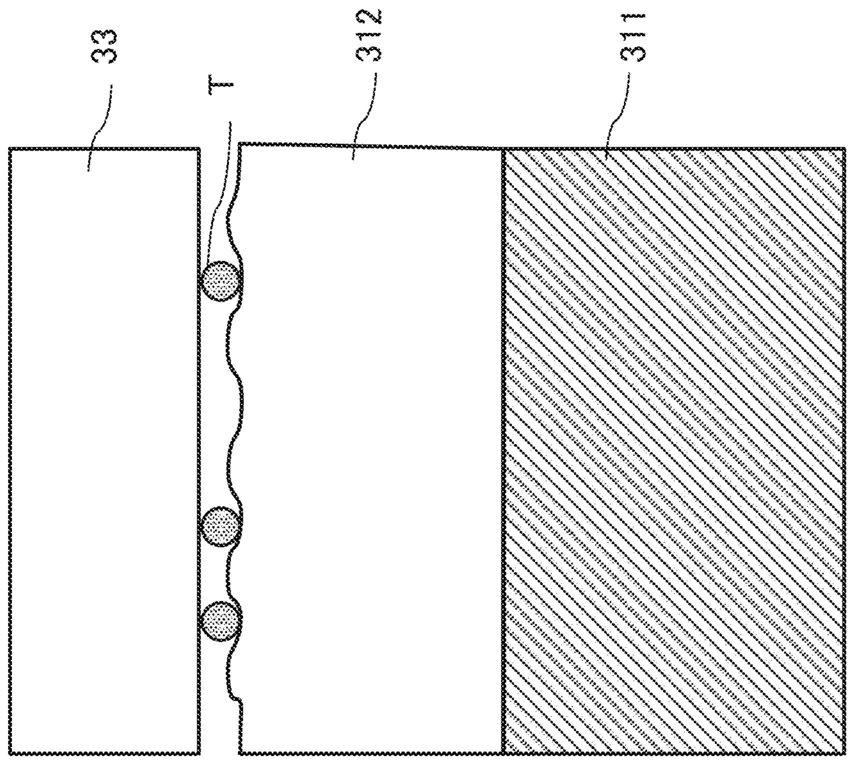
FIGS. 4A and 4B are schematic diagrams showing conditions of the drive roller and a transfer belt in the transfer unit in comparative examples.
Figure 4B:
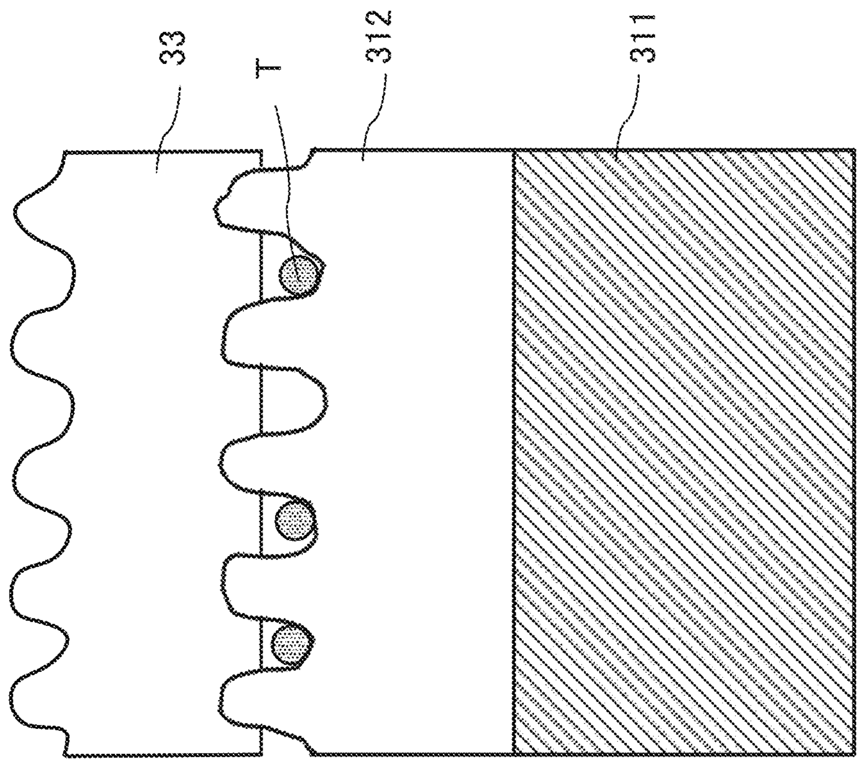

FIGS. 4A and 4B are schematic diagrams showing conditions of the surface layer 312 of the drive roller and the transfer belt in the transfer unit in the comparative example C1 and the comparative example C2. As shown in FIG. 4A, when the developing agent T has adhered between the outer peripheral surface (surface facing upward in FIG. 4A) of the surface layer 312 and the internal surface (surface facing downward in FIG. 4A) of the transfer belt 33 in the comparative example C1 (when the surface roughness Rz is less than the volume mean particle diameter MV), the frictional force deceases, the slippage occurs between the surface layer 312 and the transfer belt 33, and a printing defect (shrinkage or the like of the image) is likely to occur. Further, as shown in FIG. 4B, in the comparative example C2 (when the surface roughness Rz is too large), the undulation of the surface layer 312 is copied to the transfer belt 33, an undulated shape appears on an external surface (surface facing upward in FIG. 4B) of the transfer belt 33, and a printing defect due to the deformation of the transfer belt 33 occurs.

Figure 5A:
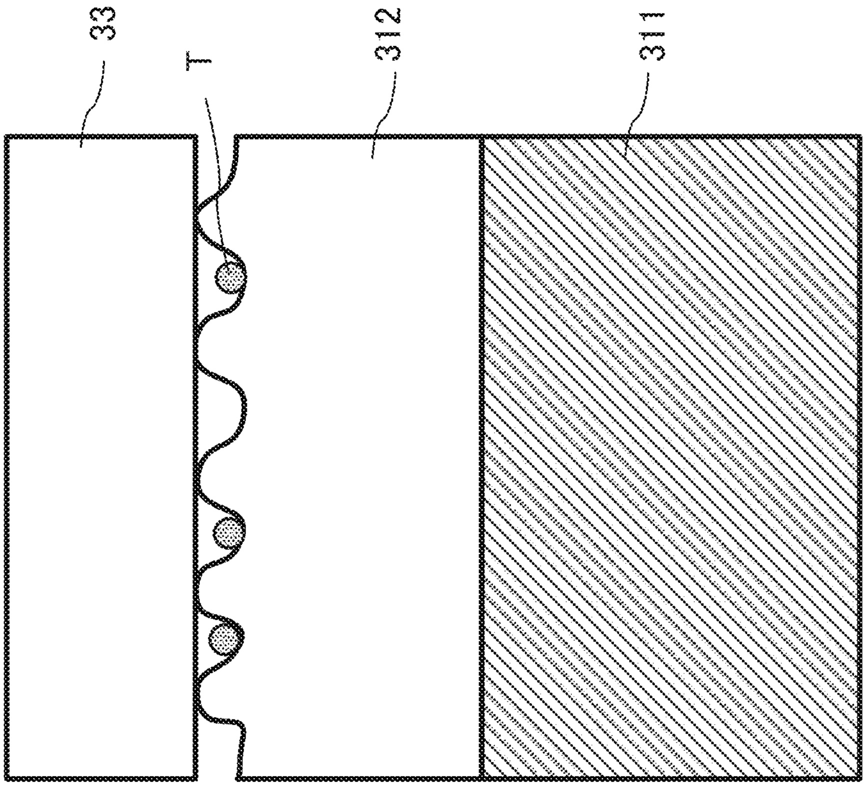
FIGS. 5A and 5B are schematic diagrams showing conditions of the drive roller and the transfer belt in the transfer unit according to the first embodiment.
Figure 5B:
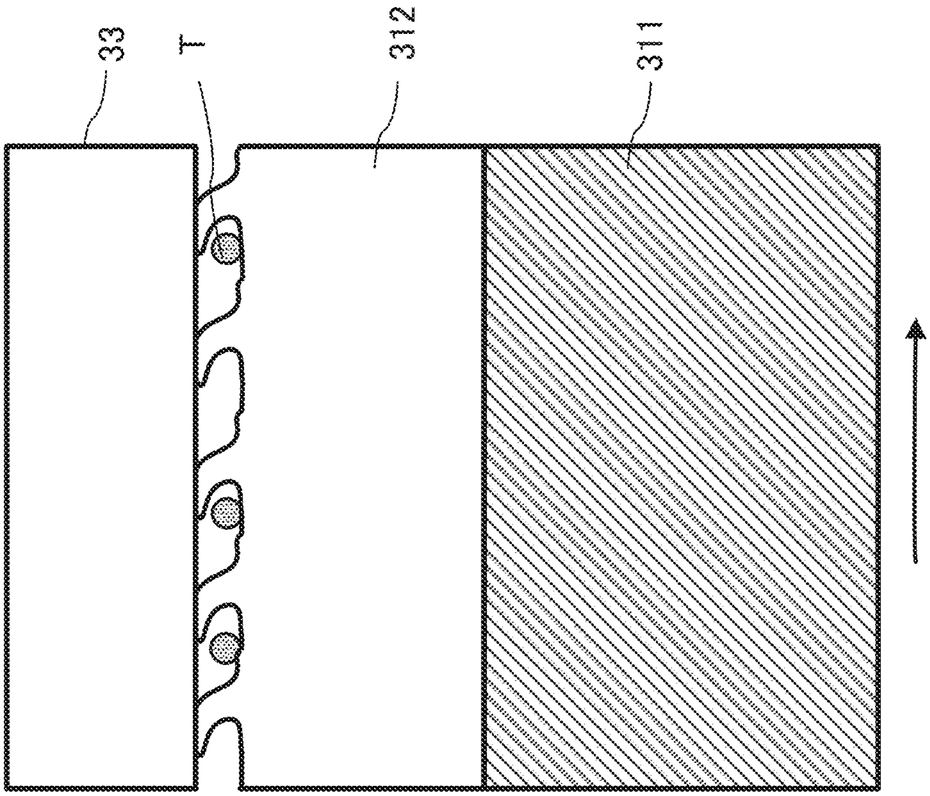

FIGS. 5A and 5B are schematic diagrams showing conditions of the drive roller 31 and the transfer belt 33 in the transfer unit 30 in the example 1 and the example 2 according to the first embodiment. As shown in FIG. 5A, when the developing agent T has adhered between the outer peripheral surface (surface facing upward in FIG. 5A) of the surface layer 312 and the internal surface (surface facing downward in FIG. 5A) of the transfer belt 33 in the example 1 or the example 2 (when the surface roughness Rz is greater than the volume mean particle diameter MV), there is substantially no change in the shape of the outer peripheral surface of the surface layer 312 and the frictional force does not change. Further, while the surface layer 312 in the example 1 or the example 2 (when the surface roughness Rz is in an appropriate range greater than the volume mean particle diameter MV) is deformed as shown in FIG. 4B when the drive roller rotates, convexities of the surface layer 312 make contact with the transfer belt 33 in a large area, by which high frictional force can be maintained. Accordingly, in the example 1 or the example 2 (when the surface roughness Rz is greater than the volume mean particle diameter MV), the printing defect does not occur.

Figures 6A, 6B:
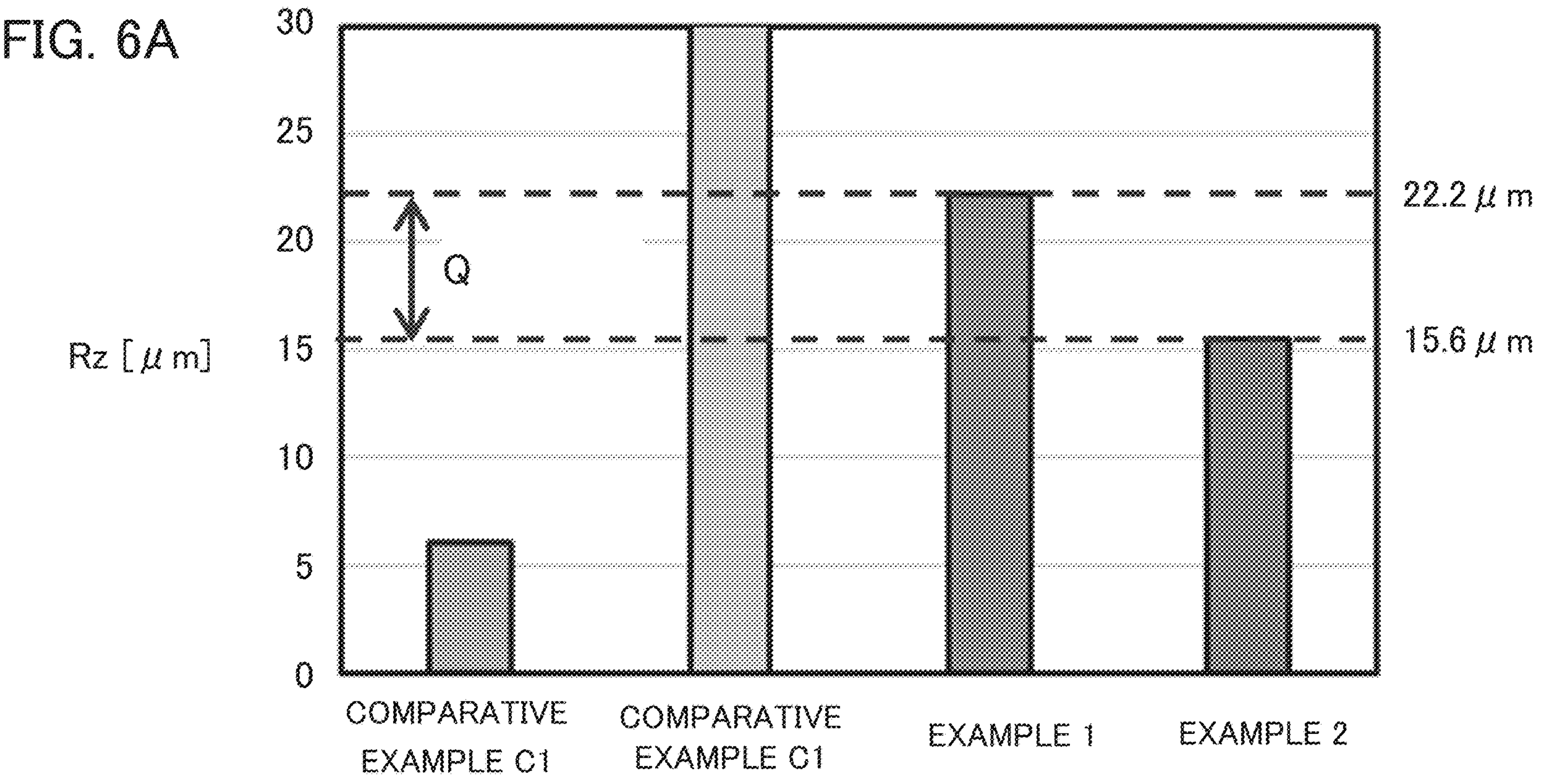
FIG. 6A shows surface roughness of a surface layer of the drive roller in a comparative example C1, a comparative example C2, an example 1 in the embodiment and an example 2 in the embodiment.
FIG. 6B shows their evaluation results.

FIG. 6A shows the surface roughness Rz [μm] of the surface layer of the drive roller in the comparative example C1, the comparative example C2, the example 1 and the example 2, and FIG. 6B shows their evaluation results. The surface roughness Rz varies depending on the resin material as the coating material of the coating. If the surface roughness Rz is too large, the undulation of the surface of the drive roller 31 is copied to the transfer belt 33 and the printing defect occurs.

As shown as the comparative example C1 in FIGS. 6A and 6B, if the surface roughness Rz is too small, the frictional force between the transfer belt 33 and the surface layer 312 of the drive roller 31 decreases (indicated by a symbol "X" as a cross mark in FIG. 6B) when the developing agent has adhered to the surface of the drive roller 31. In this case, the printing defect occurs in the image forming device 1 in FIG. 1. In the image forming device 1*a* in FIG. 2, the printing defect occurs due to deterioration in conveyability of the record medium P. Further, as shown as the comparative example C2 in FIGS. 6A and 6B, if the surface roughness Rz is too large, the undulation of the surface layer 312 of the drive roller 31 appears on the upper surface of the transfer belt 33 and the transfer belt 33 is deformed (indicated by the symbol "X" as a cross mark in FIG. 6B). In this case, the printing defect due to the deformation of the transfer belt 33 occurs in the image forming device 1 in FIG. 1. In the image forming device 1*a* in FIG. 2, the printing defect occurs due to the deterioration in the conveyability of the record medium P.

As shown as the example 1 and the example 2 in FIGS. 6A and 6B, if the surface roughness Rz is in the appropriate range, when the developing agent adheres to the surface of the drive roller 31, the frictional force between the transfer belt 33 and the surface layer 312 of the drive roller 31 does not decrease (indicated by a symbol "O" as a circle mark in FIG. 6B) and the defamation of the transfer belt 33 does not occur either (indicated by the symbol "O" as a circle mark in FIG. 6B). In this case, the printing defect does not occur in the image forming device 1 or 1*a*. As shown in FIGS. 6A and 6B, the appropriate range of the surface roughness Rz is as follows, for example:

$$15.6 \leq Rz[\mu m]22.2.$$

The ratio of the volume mean particle diameter MV of the developing agent to the surface roughness Rz of the outer peripheral surface of the surface layer 312 is desired to be higher than or equal to 2.2 (~15.6 μm/7 μm). Further, the ratio of the volume mean particle diameter MV of the developing agent to the surface roughness Rz of the outer peripheral surface of the surface layer 312 is desired to be lower than or equal to 3.2 (~22.2 μm/7 μm).

(4) Thermal Property of Surface Layer 312 of Drive Roller 31

(4-1) Thermal Property Measurement Device

Figure 7:
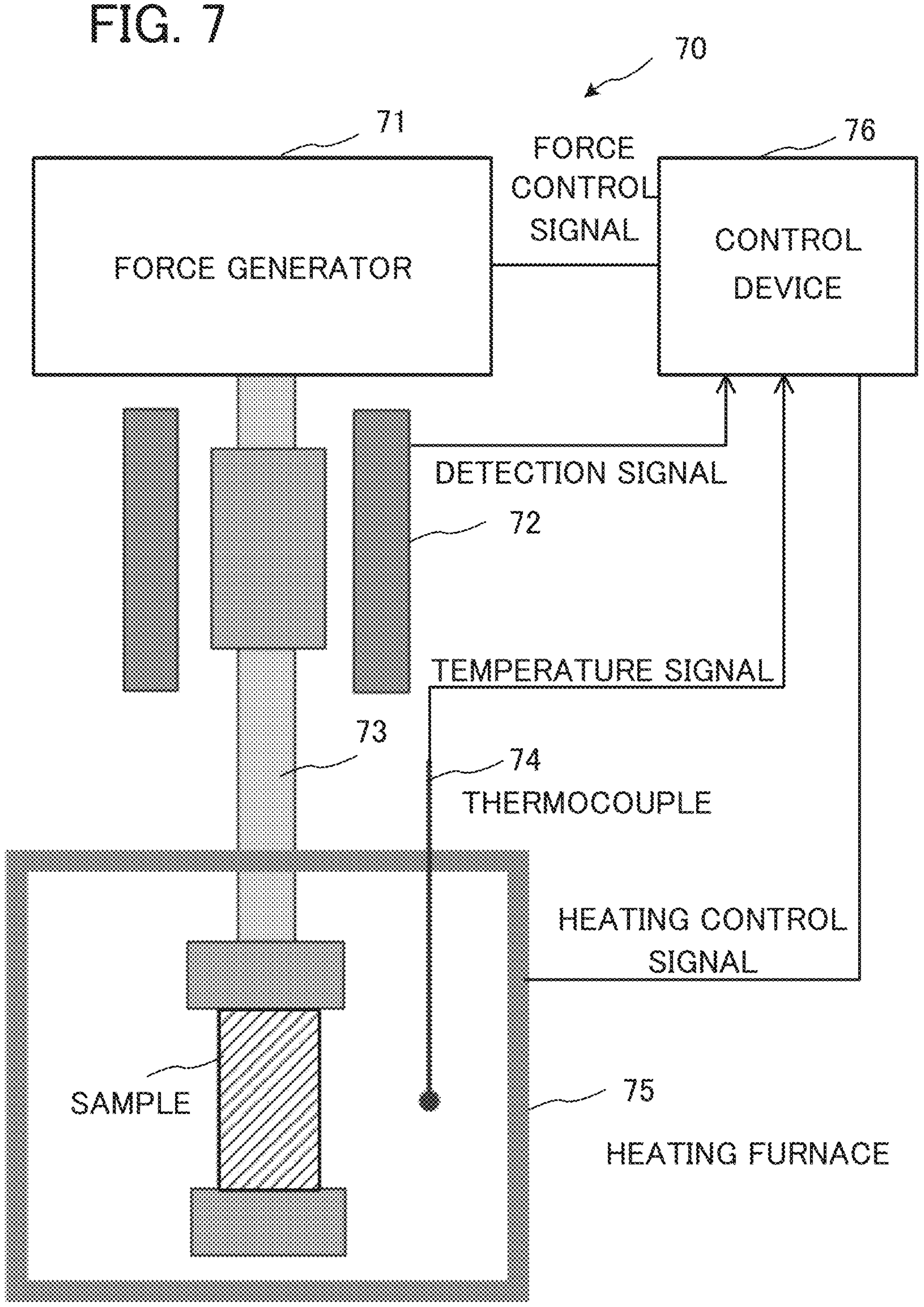
FIG. 7 is a schematic diagram showing a dynamic viscoelasticity measurement device.

FIG. 7 is a schematic diagram showing a dynamic viscoelasticity measurement device 70 used for measuring the thermal property of the surface layer 312 The dynamic viscoelasticity measurement device 70 applies sinusoidal stress generated by a force generator 71 to a sample via a probe 73 and detects distortion of the sample caused by the stress with a distortion detector 72. Since oscillation ratio of the stress and the distortion at that time is proportional to the elastic modulus of the sample, a complex elastic modulus E* can be obtained. In cases of a viscoelastic body such as a high polymeric material, for the stress applied in the form of a sinusoidal wave, the distortion is detected in the form of a sinusoidal wave with a shifted phase, and viscosity can be obtained from the phase delay between the stress and the distortion. Heating control of a heating furnace 75 is performed by using a temperature signal from a thermocouple 74 observing the temperature of the sample. The operation of the dynamic viscoelasticity measurement device 70 is controlled by a control device 76.

The measurement of the thermal property of the surface layer 312 as the sample is performed in regard to each of a plurality of temperatures and each of a plurality of frequencies. Measurement conditions in this embodiment are shown below.

TEMPERATURE CONDITION: The temperature was changed at the rate of 1° C./min in a range of −70° C. to 150° C.

FREQUENCY: Seven frequencies: 0.05 Hz, 0.1 Hz, 0.5 Hz, 1 Hz, 5 Hz, 10 Hz and 20 Hz were used as frequencies of the oscillation of the force.

SAMPLE: Resin material approximately 20 mm long×9 mm wide×0.6 mm thick was used.

Here, an explanation will be given of a storage elastic modulus E' and a loss elastic modulus E" as the components of the complex elastic modulus E* and a loss tangent tan δ obtained from the storage elastic modulus E' and the loss elastic modulus E". The storage elastic modulus E' is a scale that reflects the property of an elastic (spring) component of the sample and represents energy that is recovered perfectly by storage of force (energy) applied per cycle. The loss elastic modulus E" is a scale that reflects the property of a viscous (dashpot) component of the sample and represents energy as force (energy) applied per cycle that is lost as heat. Relationship among the complex elastic modulus E", the storage elastic modulus E' and the loss elastic modulus E" is represented by the following expression (1) to (3):

$$E^* = E' + E'' \quad (1)$$

$$E' = E^* \cos\theta \quad (2)$$

$$E'' = E^* \sin\theta \quad (3).$$

The loss tangent tan δ is the ratio between the storage elastic modulus E' and the loss elastic modulus E". Namely, tan δ represents the ratio between energy supplied from the outside and energy lost as heat and indicates an oscillation absorption property as one of viscoelastic properties. The loss tangent tan δ is represented by the following expression (4):

$$\tan\delta = E''/E' \quad (4).$$

(4-2) Loss Tangent tan δ and Storage Elastic Modulus E' of Surface Layer 312

Figure 8:
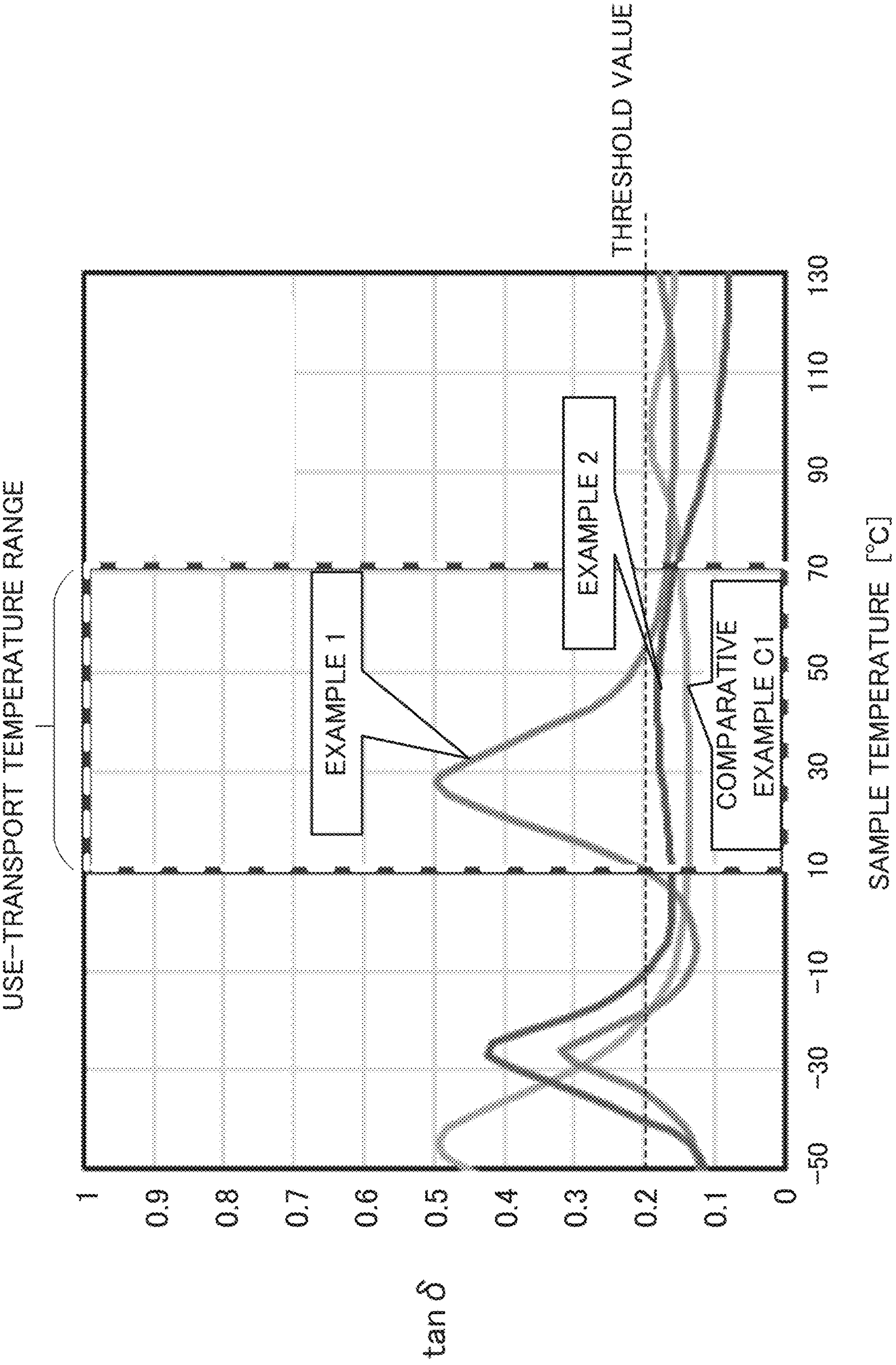
FIG. 8 is a diagram showing measurement results of temperature characteristics of a loss tangent tan δ of resin material (coating material) of each surface layer in the comparative example C1, the example 1 and the example 2.

FIG. 8 is a diagram showing measurement results of temperature characteristics of the loss tangent tan δ of the resin material (coating material) of each surface layer 312 in the comparative example C1, the example 1 and the example 2. In FIG. 8, the horizontal axis represents sample temperature [° C.] and the vertical axis represents the loss tangent tan δ. The property of the resin material of the surface layer 312 as a viscous body increases as the loss tangent tan δ approaches 1, and the property of the resin material of the surface layer 312 as an elastic body increases as the loss tangent tan δ approaches 0.

As shown in FIG. 8, a peak position of the graph of the loss tangent tan δ indicates a grass transition temperature Tg of each resin material in the comparative example C1, the example 1 and the example 2. The resin material shifts into a state in which action of molecules is facilitated and enters a soft rubber state as the temperature rises to the grass transition temperature Tg or higher, and the resin material shifts into a state in which the action of molecules is restricted and enters a hard glass state as the temperature falls below the grass transition temperature Tg. The glass state means a state of being hard, and the temperature of entering the glass state is referred to as the grass transition temperature (i.e., grass transition point). Namely, the grass transition temperature Tg indicates that a structural change of the resin material occurs at the temperature Tg. When the use-transport temperature range is specified as a range of sample temperatures 10° C. to 70° C., if the loss tangent tan δ is greater than or equal to 0.2, the resin material in the use-transport temperature range (actual use temperature region) undergoes a structural change and approaches a viscous body. Therefore, when a material not undergoing the structural change due to the grass transition is selected as the material of the surface layer 312 and the use-transport temperature range is specified as the range of sample temperatures 10° C. to 70° C., the resin material in the example 2 satisfying the following expression (5) is desirable:

$$\tan\delta < 0.2 \quad (5).$$

Figure 9:
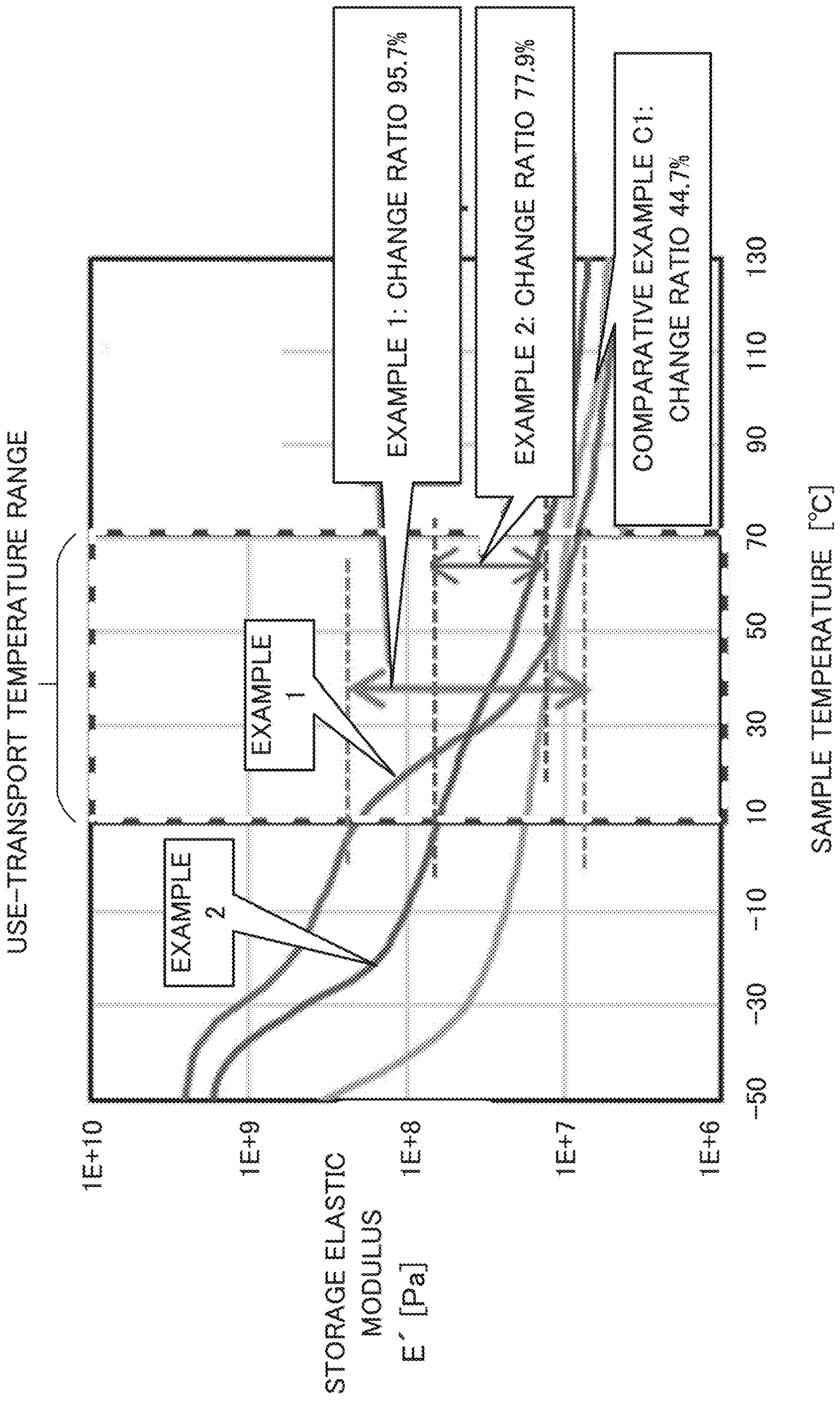
FIG. 9 is a diagram showing measurement results of temperature characteristics of a storage elastic modulus E' of the resin material (coating material) of each surface layer in the comparative example C1, the example 1 and the example 2.

FIG. 9 is a diagram showing measurement results of temperature characteristics of the storage elastic modulus E' of the resin material (coating material) of each surface layer 312 in the comparative example C1, the example 1 and the example 2. In FIG. 9, the horizontal axis represents the sample temperature [° C.] and the vertical axis represents the storage elastic modulus E'.

When a decrease ratio of the storage elastic modulus E' is 95.7%, the resin material in the use-transport temperature range (actual use temperature region) undergoes a structural change and approaches a viscous body. Since the transfer belt 33 is stretched in the transfer unit 30, the outer peripheral surface of the surface layer 312 of the drive roller 31 and the internal surface of the transfer belt 33 are in contact with each other at a constant pressure. When the resin material of the surface layer 312 undergoes a structural change due to the temperature and approaches a viscous body, there can occur a state in which a part of the resin material is defamed by pressure due to the stretching of the transfer belt 33 and the transfer belt 33 sticks to the drive roller 31. As a result, the frictional force of a part of the outer peripheral surface of the surface layer 312 of the drive roller 31 that the transfer belt 33 is sticking to differs from the frictional force of a part not in contact with the transfer belt 33 and it becomes impossible to drive the transfer belt 33 at a desired conveyance speed. As is seen in FIG. 9, when the use-transport temperature range is specified as the range of sample temperatures 10° C. to 70° C., the decrease ratio of the storage elastic modulus E' is desired to satisfy the following expression (6):

$$44.7E' \text{ decrease ratio}[\%] \leq 77.9 \quad (6).$$

Further, as is seen in FIG. 9, when the use-transport temperature range is specified as the range of sample temperatures 10° C. to 70° C., the storage elastic modulus E' is desired to satisfy the following expression (7):

$$8.3E+06 \leq E'[\text{Pa}] \leq 1.95E+08 \quad (7).$$

Here, $8.3E+06=8.3\times10^6$ and $1.95E+08=1.95\times10^8$.

To sum up, as shown in FIGS. 4A and 4B, in both of the example 1 and the example 2, the outer peripheral surface of the surface layer 312 has the surface roughness Rz with which the slippage due to the developing agent is unlikely to occur. However, when the use-transport temperature range is specified as the range of sample temperatures 10° C. to 70° C., the resin material in the example 2 satisfying all of the expressions (5) to (7) is preferable from the viewpoint of the thermal property of the surface layer 312.

(4-3) Condition of Outer Peripheral Surface of Surface Layer 312

Figure 10A:
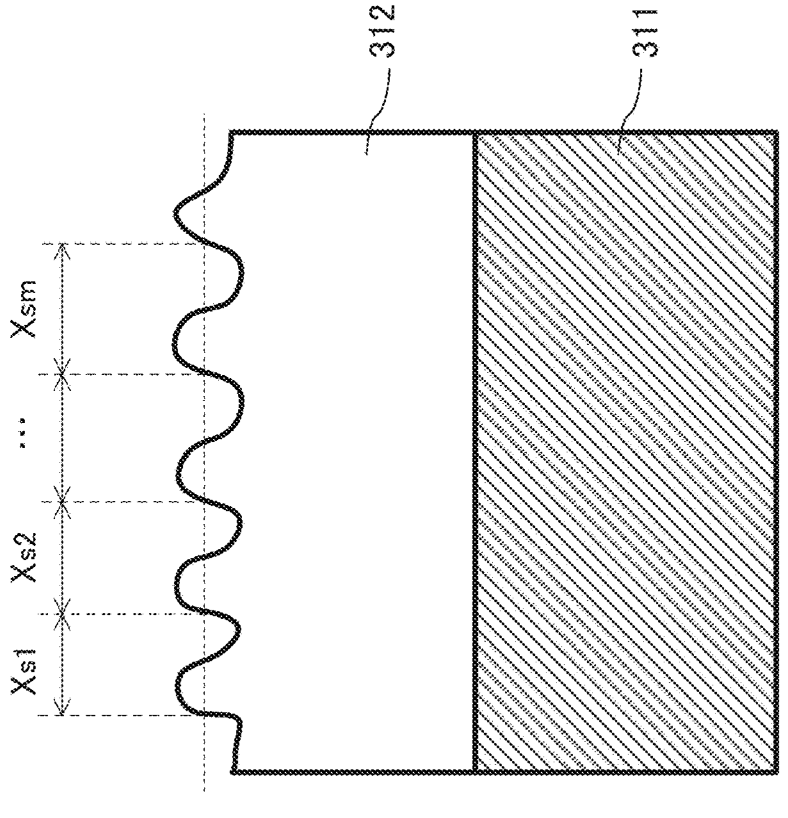
FIG. 10A shows a schematic cross section of the surface layer of the drive roller and FIG. 10B shows condition of an outer peripheral surface of the surface layer.
Figure 10B:
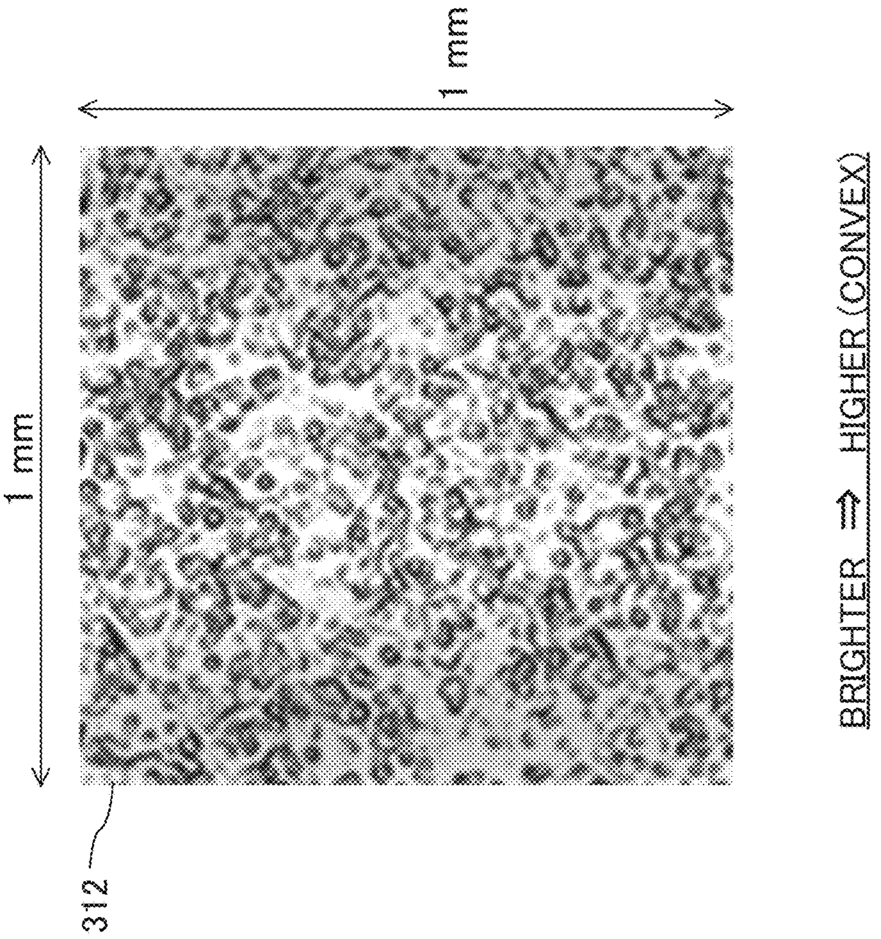

FIG. 10A shows a schematic cross section of the surface layer 312 of the drive roller 31 and FIG. 10B shows the condition of the outer peripheral surface of surface layer 312. In FIG. 10B, a brighter part is a higher part (i.e., a convex part). The average Sm [μm] of the length of a contour curve element representing the distance between a convex part and a convex part of the surface layer 312 is 49.2 μm on the surface layer in the comparative example C1, 54.7 μm on the surface layer in the comparative example C2, 61.0 μm on the surface layer in the example 1, and 80.7 μm on the surface layer in the example 2. Here, the average Sm [μm] of the length of the contour curve element is calculated by the following expression (8):

$$Sm = \frac{1}{m}\sum_{i=1}^{N} X_{si}. \quad (8)$$

Here, $X_{si}$ represents a length corresponding to one contour curve element shown as the surface layer 312 in FIG. 10A. From this measurement result, the average Sm [μm] of the length of the contour curve element on the surface layer 312 of the drive roller 31 is desired to satisfy the following expression (9):

$$61.0 \leq Sm[\mu\text{m}] \leq 80.7 \quad (9).$$

Figure 11B:
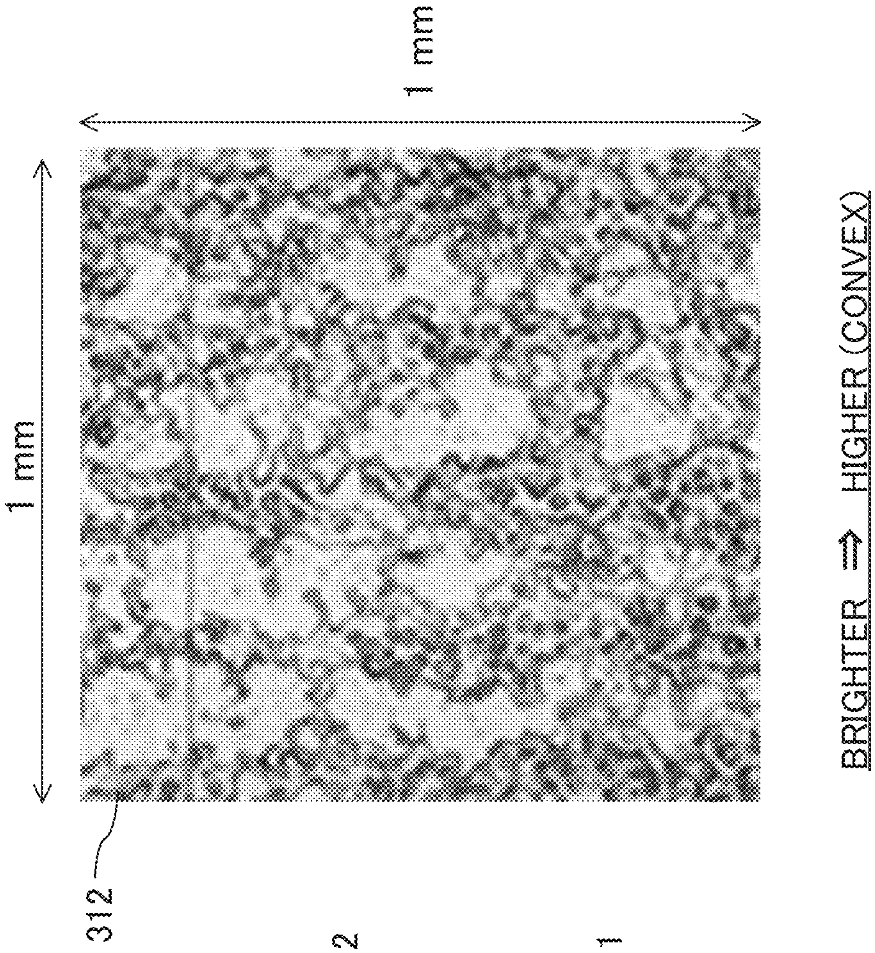
FIG. 11B shows the condition of the outer peripheral surface of the surface layer at that time.
Figure 11A:
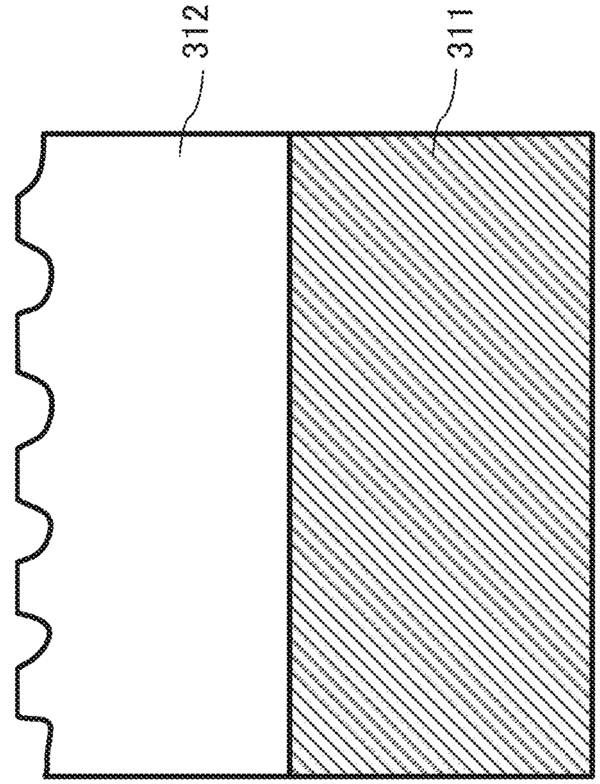
FIG. 11A shows a schematic cross section of the surface layer of the drive roller after heat and excessive pressure are applied thereto.

FIG. 11A shows a schematic cross section of the surface layer 312 of the drive roller 31, made by using a resin material (coating material) greatly influenced by the temperature, after being stored at constant high temperature and pressure, and FIG. 11B shows the condition of the outer peripheral surface of the surface layer 312 at that time. In FIG. 11B, a brighter part is a higher part (i.e., a convex part). As shown in FIG. 11A, when the viscosity of the resin material of the surface layer 312 is high, a top part of the surface layer 312 of the drive roller 31 after heat and excessive pressure are applied thereto can be deformed. Specifically, when a resin material greatly influenced by the temperature is used for the surface layer 312 and a test reproducing a state of being stored under a high temperature condition due to transportation or the like is executed by using the transfer belt stretched at a constant pressure, a top part of the surface layer 312 of the drive roller 31 that has been in contact with the transfer belt becomes flat. In that case, the area of contact of the transfer belt and the drive roller becomes larger than that before the test and the frictional force increases. As a result, in one cycle of the drive roller, only a part that has been in contact with the transfer belt has different conveyability, and thus a ratio of bright parts in FIG. 11B increases.

(4-4) Measurement of Differential Scanning Calory DSC

Figure 12:
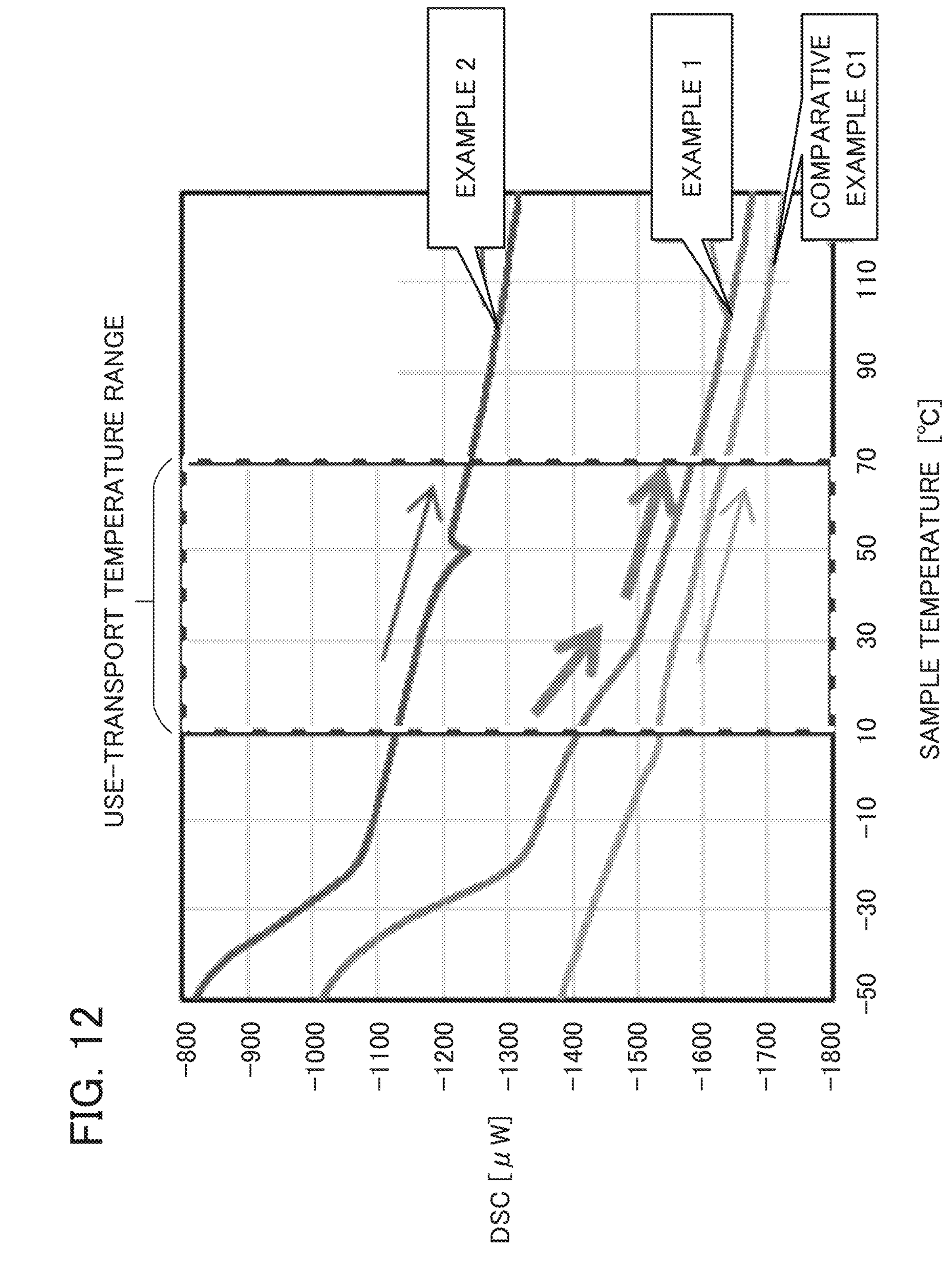
FIG. 12 is a diagram showing measurement results of temperature characteristics of differential scanning calory DSC of each surface layer in the comparative example C1, the example 1 and the example 2.

FIG. 12 is a diagram showing measurement results of temperature characteristics of differential scanning calory DSC [μW] in the comparative example C1, the example 1 and the example 2. As another method of examining the thermal property of the resin material of the surface layer 312 of the drive roller 31, there is a method of measuring the differential scanning calory DSC (Differential Scanning Calorimetry). In this embodiment, the DSC of the resin material (5 mg sample) of each surface layer 312 in the comparative example C1, the example 1 and the example 2 was measured by using a differential scanning calorimeter (DSC6220: manufactured by Hitachi High-Technologies Corporation). The DSC enables examination of transitions such as melting, glass transition and crystallization, reaction and thermal history, and measurement of specific heat capacity. In this embodiment, a thermal flow difference of each resin material with respect to a reference sample was detected by using the DSC. Measurement conditions of the DSC in this embodiment are described in the following Table 1: Table 1 shows measurement conditions stipulated in ISO. In Table 1, Cel represents temperature in Celsius, min represents minutes, s represents seconds, ON represents being in use of gas, ml represents milliliters, 1st Run represents a first data acquisition period, and 2nd Run represents a next data acquisition period.

TABLE 1

| | TEMP. PROGRAM | Cel | Cel | Cel/min | min | s | NITROGEN GAS | ml/min |
|---|---|---|---|---|---|---|---|---|
| 1st Run | 1 | 25 | −70 | 25 | 15 | 0.5 | ON | 40 |
| | 2 | −70 | 140 | 10 | 5 | 0.5 | ON | 40 |
| | 3 | 140 | −70 | 25 | 15 | 0.5 | ON | 40 |
| 2nd Run | 4 | −70 | 140 | 10 | 5 | 0.5 | ON | 40 |
| | 5 | 140 | 25 | 25 | 120 | 0.5 | ON | 40 |

In FIG. 12, a part where the gradient of baseline behavior changes indicates the grass transition temperature Tg. When the grass transition temperature Tg exists in the range of sample temperatures 10° C. to 70° C., a structural change of the resin material occurs, a part of the resin material is defamed as shown in FIGS. 11A and 11B, and the transfer belt 33 sticks to the surface layer 312 of the drive roller 31. Therefore, a material desirable as the resin material of the surface layer 312 is a material whose DSC 2nd Run baseline behavior gradient does not change in the range of sample temperatures 10° C. to 70° C. and indicating that there is no grass transition point, namely, no change of state of the resin material occurs, in the range of 10° C. to 70° C. In other words, the grass transition temperature [° C.] is desired to exist outside the range of 10° C. to 70° C. or not to exist.

(5) Effect

As described above, by prescribing the surface roughness Rz of the outer peripheral surface of the surface layer 312 of the drive roller 31 and the thermal property of the resin material of the surface layer 312, the decrease in the frictional force between the transfer belt 33 and the drive roller 31 due to the developing agent entering the transfer unit 30 (or 30*a*) at the time of foaming the image can be inhibited, and the conveyability of the transfer belt 33 and the record medium P does not deteriorate. Accordingly, an effect is obtained in that the printing defect such as image shrinkage does not occur.

The occurrence of the printing defect such as image shrinkage can be inhibited further by satisfying one or more (preferably, two or more) of the expression (5), the expression (6), the expression (7), the expression (9) and "there is no glass transition point in the range of 10° C. to 70° C." as the above-described conditions of the thermal property of the surface layer 312 of the drive roller 31.

(6) Modification

The transfer units 30 and 30*a* and the image foaming devices 1 and 1*a* described above are applicable also to image forming devices of different types such as an MFP (Multi-Function Peripheral), a facsimile machine and a copy machine.

(7) Description of Reference Characters 1, 1*a*: image foaming device, 30, 30*a*: transfer unit, 31 drive roller (rotational body), 33: transfer belt (belt), 34: spring mechanism, 70: dynamic viscoelasticity measurement device, 311: shaft body, 312: surface layer (coating layer), DSC: differential scanning calory, E': storage elastic modulus, E": loss elastic modulus, E*: complex elastic modulus, MV: volume mean particle diameter, Rz: surface roughness, T: developing agent, tan δ: loss tangent.

What is claimed is:

1. An image forming device, comprising:

an image forming section that includes developing agents and forms a developing agent image using the developing agents; and a transfer unit that transfers the developing agent image wherein the transfer unit includes a belt; and a rotational body that stretches the belt, wherein the rotational body includes a shaft body, and a surface layer provided on an outer side of the shaft body in radial directions, wherein the surface layer has a surface roughness Rz at an outer peripheral surface portion of the surface layer that is greater than a volume mean particle diameter of the developing agents and the surface roughness Rz satisfies $$15.6 \leq Rz[\mu m] \leq 22.2,$$

wherein an average Sm of length of a contour curve element on the surface layer satisfies $$61.0 \leq Sm[\mu m] \leq 80.7.$$

2. The transfer unit image forming device according to claim 1, wherein a ratio of the surface roughness of the outer peripheral surface of the surface layer to the volume mean particle diameter of the developing agent is set to be higher than or equal to 2.2 and lower than or equal to 3.2.

3. The image forming device according to claim 1, wherein the surface layer is formed with resin material.

4. The image forming device according to claim 3, wherein the resin material contains urethane resin as a principal component.

5. The image forming device according to claim 3, wherein the resin material has no glass transition point in a temperature range of 10° C. to 70° C.

6. The image forming device according to claim 3, wherein a maximum value of a viscoelastic loss tangent of the resin material is less than or equal to 0.2 in a temperature range of 10° C. to 70° C.

7. The image forming device according to claim 6, wherein $$44.7 \leq (E'_{70}/E'_{10}) \times 100[\%] \leq 77.9$$

is satisfied, where $E'_{10}$ represents a storage elastic modulus of the resin material at a temperature of 10° C. and $E'_{70}$ represents the storage elastic modulus of the resin material at a temperature of 70° C.

8. The image forming device according to claim 6, wherein the resin material satisfies $$8.3E+06 \leq E'[Pa] \leq 1.95E+08$$

in a temperature range of 10° C. to 70° C., where E' represents a storage elastic modulus.

9. The image forming device according to claim 3, wherein $$44.7 \leq (E'_{70}/E'_{10}) \times 100[\%] \leq 77.9$$

is satisfied, where $E'_{10}$ represents a storage elastic modulus of the resin material at a temperature of 10° C. and $E'_{70}$ represents the storage elastic modulus of the resin material at a temperature of 70° C.

10. The image forming device according to claim 3, wherein the resin material satisfies $$8.3E+06 \leq E'[Pa] \leq 1.95E+08$$

in a temperature range of 10° C. to 70° C., where E' represents a storage elastic modulus.

11. The image forming device according to claim 1, wherein the surface roughness Rz satisfies $$15.6 \leq Rz[\mu m] < 22.$$

12. An image forming device, comprising:

an image forming section that includes developing agents and forms a developing agent image using the developing agents; and a transfer unit that transfers the developing agent image, wherein the transfer unit includes a belt; and a rotational body that stretches the belt, wherein the rotational body includes a shaft body, and a surface layer provided on an outer side of the shaft body in radial directions so as to entirely cover an outer peripheral surface thereof, wherein the surface layer has a surface roughness Rz at an outer peripheral surface portion of the surface layer that is greater than a volume mean particle diameter of the developing agents and the surface roughness Rz satisfies $$15.6 \leq Rz[\mu m] \leq 22.2,$$

wherein an average Sm of length of a contour curve element on the surface layer satisfies $$61.0 \leq Sm[\mu m] \leq 80.7.$$

13. The image forming device according to claim 12, wherein a minimum thickness of the surface layer is greater than 22.2 μm, which is a maximum size of the surface roughness Rz.

* * * * *